March 1, 1960  F. SINGER  2,926,588
DEPTH OF FIELD INDICATOR FOR PHOTOGRAPHIC CAMERAS
Filed Dec. 28, 1955  2 Sheets-Sheet 1

United States Patent Office 2,926,588
Patented Mar. 1, 1960

2,926,588

DEPTH OF FIELD INDICATOR FOR PHOTOGRAPHIC CAMERAS

Franz Singer, Munich, Germany, assignor, by mesne assignments, to Compur-Werk Friedrich Deckel OHG., Munich, Germany, a firm of Germany Application December 28, 1955, Serial No. 555,964

Claims priority, application Germany January 5, 1955

6 Claims. (Cl. 95—64)

This invention relates to a depth of field indicator for photographic cameras.

An object of the invention is to provide a generally improved and more satisfactory depth of field indicator.

Another object is the provision of a depth of field indicator so designed and constructed as to have a plurality great angular range of adjusting movement, so that the focusing scale or distance scale with which the depth of field indicator cooperates may be correspondingly expanded or extended to cover a wide angular range, thereby enabling the graduations and markings of the scale to be placed far apart and in a legible manner.

Still another object is the provision of a construction fulfilling the above mentioned objects, which at the same time is extremely compact and simple.

A further object is the provision of an improved depth of field indicator so designed and constructed that it may be readily accommodated in the restricted space available in or on a modern objective shutter or lens mount of acceptable design.

A still further object is the provision of a depth of field indicator especially adapted for use on a compact structure which combines an objective shutter housing and focusing lens mount, although the invention is not limited to use in this environment.

A still further object is the provision of an indicator having motion transmission means associated therewith, so designed that the motion of the part which operates the depth of field indicator (e.g., the diaphragm aperture adjusting member) is not necessarily transferred in a linear manner but may be transferred in an irregular or non-linear manner to the parts which indicate the depth of field.

These and other desirable objects may be attained in the manner disclosed as an illustrative embodiment of the invention in the following description and in the accompanying drawings forming a part hereof, in which.

The same reference numerals throughout the several views indicate the same parts.

As is well understood, the depth of field, or spacial depth (in a direction along the optical axis of the camera) within which all objects will be focused sufficiently sharply and clearly on the film of a photographic camera, is dependent in part upon the diameter of the diaphragm aperture or stop. According to the present invention, an indication of the closest and farthest distances of objects sufficiently sharply focused on the film is given by means of two indicating pointers movable over the same graduated distance scale employed in focusing the camera, and the extent of movement of the pointers is sufficiently great so that the distance scale or focusing scale may be expanded to cover a considerable space, thereby making the graduations far apart and easy to read.

Figure 1:
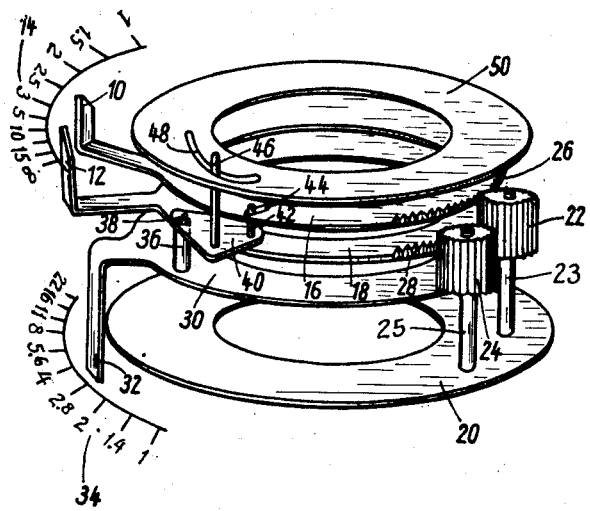
Fig. 1 is a diagrammatic perspective view of the principal operating parts of a depth of field indicator according to one embodiment of the invention.
Figure 5:
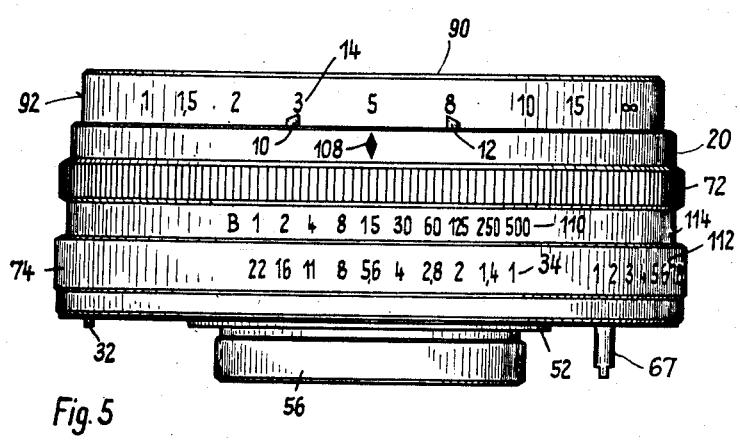
Fig. 5 is a plan or edge view of a shutter and lens mount in accordance with the preferred form of the invention.

Referring first to the diagrammatic illustration in Fig. 1, the depth of field may be read from the pointers 10 and 12, movable closer to or farther away from each other by rotation about the optical axis at the center of the shutter structure, and read in conjunction with the focusing scale or distance scale 14 arranged on any suitable part of the shutter and lens mount structure. The focusing scale or distance scale 14 is shown diagrammatically in Fig. 1, and is illustrated in Fig. 5 as being inscribed circumferentially on the forward part of the cylindrical face 92 of the focusing lens mount ring 90 which, in this preferred form, is mounted on the shutter.

Before proceeding with a further description of the parts of the depth of field indicating mechanism itself, it will be convenient first to describe a typical form of lens and shutter assembly with which the depth of field indicating mechanism may be used. It will be understood, however, that the depth of field indicator is not dependent upon any particular form of lens and shutter construction, and the construction here shown serves merely as an illustrative example.

Figure 2:
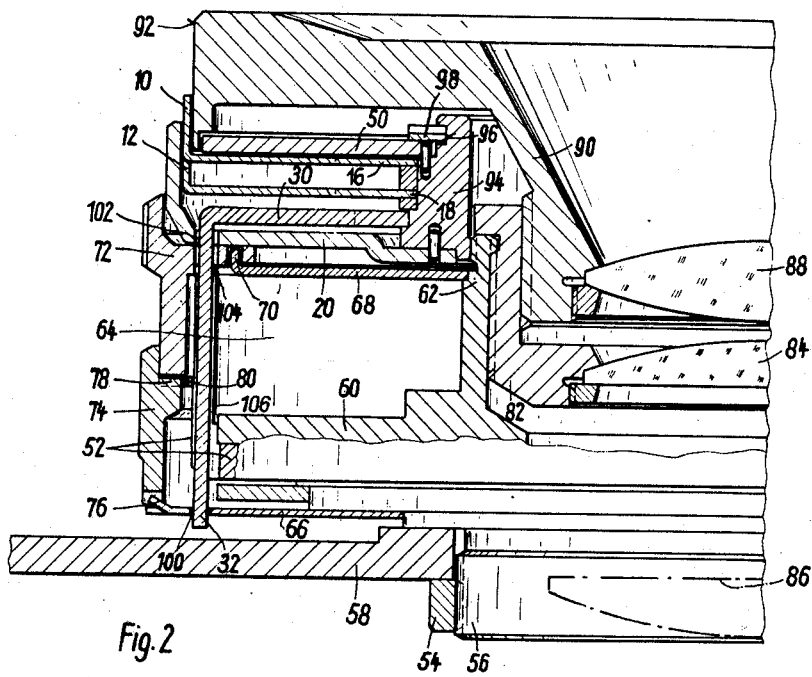
Fig. 2 is a radial section through a fragment of a photographic camera and a shutter and lens mount attached thereto, equipped with a preferred embodiment of the present invention.

Referring now to Fig. 2, the structure illustrated by way of example comprises a shutter casing 52 having the usual form of cylindrical tube projecting rearwardly centrally of the casing, as shown at 56. The shutter is attached to the front wall 58 of the photographic camera body by means of a nut 54 screwed onto suitable exterior threads on the tube 56. The shutter casing is of the usual annular form, and the optical axis extends centrally through the shutter in the familiar manner. A base plate or mechanism mounting plate 60 secured inside the annular casing 52 is provided with the usual forwardly extending tube 62, often called the front lens tube. The annular space 64 between the tube 62 and the outer cylindrical wall of the casing 52 contains the usual mechanism for opening and closing the shutter blades (not shown) which lie in a space between the mechanism plate 60 and the back wall of the shutter casing, which space also contains the usual iris diaphragm leaves or blades, adjustable to vary the size of the diaphragm aperture or stop by turning an adjusting member 66 rotatably mounted near the rear of the shutter casing about the optical axis of the shutter as a center.

The shutter is cocked or tensioned ready to make an exposure, and triggered or released for initiating the desired exposure, by any suitable mechanism preferably connected to operating parts within the associated camera body, such as the shaft 67 extending rearwardly from the shutter casing parallel to the optical axis and connected to parts in the camera body so as to turn this shaft first in one direction to cock or tension the shutter, and then in the opposite direction to release it for an exposure. The mechanism within the shutter casing for operating the shutter blades, as well as the mechanism within the camera body for controlling the shutter, may take many forms, the details of which are not pertinent to the present invention, typical examples of suitable forms being disclosed in the copending United States patent applications of Kurt Gebele, Serial No. 514,218, filed June 9, 1955 (now Patent 2,900,885, granted August 25, 1959), and Serial No. 520,875, filed July 8, 1955 (now Patent 2,900,886; granted August 25, 1959).

The time or speed of the exposure is adjustably controlled in known manner by a speed adjusting member 68 in the form of a ring rotatable near the front of the shutter casing, about the optical axis as a center, which ring conveniently rotates on a cylindrical bearing surface on the tube 62. An ear or lug 70 on the speed adjusting ring 68 enters a notch in the external speed adjusting ring 72 which is rotatable exteriorly on the side wall of the main shutter casing 52, and which has a circumferentially extending ridge or rib which is knurled or serrated for easy grasping by the fingers of the operator, for turning to adjust the speed of the shutter exposure.

Also rotatable around the main shutter casing, rearwardly of the speed adjusting ring 72, is the diaphragm aperture adjusting ring 74 which surrounds and bears on the rear part of the ring 72 and is movable axially to a limited extent, and which has at its rear edge a notch which receives a tooth or lug 76 on the internal diaphragm aperture adjusting ring 66. The latter is somewhat resilient and tends to press forwardly on the ring 74 so as to hold a tooth 78 near the forward edge thereof in engagement within any selected one of a series of notches 80 on the rear edge of the ring 72. However, the ring 74 may be manually forced rearwardly slightly, bending the resilient member 66, so as to disengage the tooth 78 from the notch 80 in which it was set, whereupon the ring 74 may be rotated to set the tooth 78 in any other selected notch 80 of the ring 72. Thus the ring 74 serves as a coupling ring between the diaphragm adjusting member 66 and the shutter speed adjusting members 68 and 72, enabling them to be coupled to each other in any one of a series of different positions of relative orientation.

Within the front lens tube 62 of the shutter, and held therein by any suitable means such as screw threads, is the fixed lens mount 82 for holding the fixed component or element 84 of the lens system. Another fixed component or element 86 may be mounted in the rear lens tube 56. The movable lens element or component 88 (movable axially for purposes of focusing) is carried by a threaded mounting ring 90 screwed into the mount or bushing 82 and capable of rotation therein so that as it is rotated in one direction or the other, it will move axially forwardly or rearwardly to cause axial movement of the lens component 88. This ring 90 has a cylindrical outer edge 92 which may be grasped by the operator for turning for focusing purposes, which cylindrical surface 92 carries the focusing or distance scale 14 as previously mentioned, the scale being graduated in any suitable units of measurement such as feet or meters, the latter being shown in the drawings.

Figure 3:
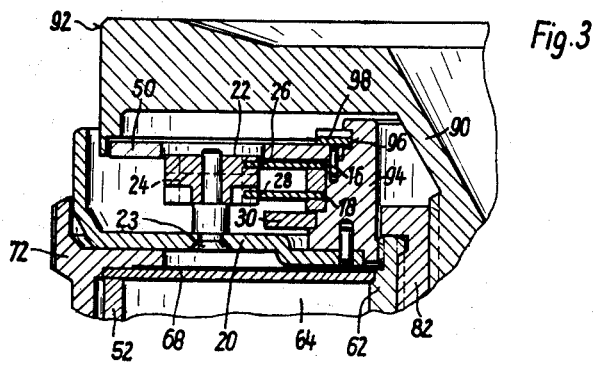
Fig. 3 is a similar radial section through a fragment of the shutter and lens mount, on a smaller scale, the section being taken on a different radial plane from that of Fig. 2.
Figure 4:
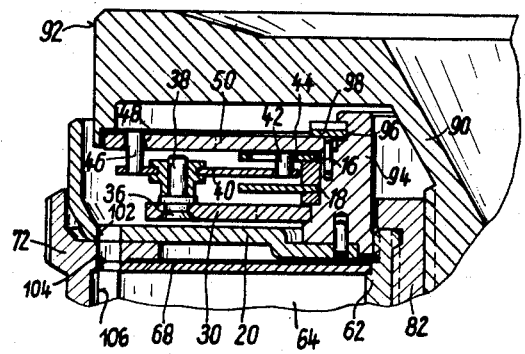
Fig. 4 is a view similar to Fig. 3, on still another radial plane.

For supporting the various parts of the depth of field indicating mechanism, according to a preferred form of the invention, there is a ring or sleeve 94 surrounding and slightly overlapping the forward end of the front lens tube 62 and mounted in fixed position thereon by screw threads or other suitable fastening means. This ring 94 has fixed to it an annular plate 20 which extends radially outwardly from the vicinity of the front end of the lens tube 62 and forms, in effect, the front wall or front closure of the annular mechanism space 64 within the shutter casing. The outer edge of the stationary plate 20 is bent forwardly and terminates in a cylindrical flange which overlaps but is spaced radially outwardly from the cylindrical surface 92, as well seen in Figs. 2–4.

Rotatable on this stationary ring 94 are two rings 16 and 18 axially spaced from each other, which rings carry radially extending arms terminating in the forwardly bent pointers or indicating members 10 and 12 previously mentioned, which extend to the exterior of the structure through the space between the wall 92 and the overlying flange of the member 20, to a visible position cooperating with the distance scale or focusing scale 14, as shown in Figs. 1, 2 and 5. In front of the rotatable ring 16 is a stationary ring 50. A corrugated annular spring 98 having its inner edge engaged in a groove 96 on the ring 94 serves to press rearwardly on this stationary ring 50 and thereby hold the rotatable rings 16 and 18, together with their associated spacer sleeves, against axial displacement relative to the fixed ring 94.

These two rings 16 and 18 are coupled to each other to move through equal amounts in opposite directions. The preferred coupling comprises two pinions 22 and 24 (Figs. 1 and 3) rotating on the respective stub shafts 23 and 25 fixed to the stationary plate 20 and extending in directions parallel to the optical axis. The pinion 22 meshes with gear teeth 26 formed on a portion of the periphery of the first ring 16, and also meshes with the teeth of the other pinion 24 which, in turn, meshes also with gear teeth 28 formed on a portion of the periphery of the second ring 18. The two pinions are of equal size, so that when either ring moves in one direction, the other ring will move to an equal angular extent in the opposite direction.

For operating these rings 16 and 18 so as to move the pointers 10 and 12 over the distance scale 14, there is a ring 30 also mounted for rotation on the stationary ring or sleeve 94, rearwardly of the ring 18. This ring 30 has a radial extension as seen in Figs. 1 and 2 and is then bent rearwardly (parallel to the optical axis) at 32 and enters a notch 100 in the diaphragm aperture or stop adjusting member 66, so that whenever the diaphragm is adjusted to a different aperture, the turning of the member 66 will cause corresponding turning of the member 30, 32. To allow freedom of rotary movement of the member 30, 32 through the necessary angular extent, there are arcuate slots 102 in the member 20, 104 in the member 72, and 106 in the main casing 52, through which slots the axially extending part 32 passes.

The rotary movements of the part 30, resulting from changes in the diaphragm aperture or stop, are transmitted to the rings 16 and 18 through transmission means so designed that the pointer rings 16 and 18 may, if necessary, be moved in a non-linear relation to the movements of the ring 30, to any extent of irregularity or disconformity required by the particular depth of field characteristics of the lens system employed or by the particular arrangement of the graduations of the focusing scale 14 relative to the graduations of the diaphragm aperture scale 34. This motion transmitting means is best understood by reference to Fig. 1, with certain parts thereof shown also in Fig. 4.

A stub shaft 36 carried by and fixed to the ring 30, and extending parallel to the optical axis, has a reduced forward end 38 on which is rotatably mounted the plate 40 lying in a plane between the rings 16 and 18. At one point the plate 40 carries a forwardly projecting pin 42 which extends into and is movable along a slot 44 formed approximately radially in the ring 16. At another point on the plate 40 is a control pin 46 which projects forwardly through a controlling guide slot or cam slot 48 in the fixed ring 50. The pins 42 and 46 are angularly spaced from each other, with respect to the bearing pin 38 on which the plate 40 rotates.

The control slot or cam slot 48 is shaped in such manner as to swing the plate 40 on its pivot 38, to any extent necessary, as the plate moves bodily in one direction or the other along with the ring 30, when the diaphragm aperture is changed. The shape of the cam slot 48 is, of course, designed to give the desired motion to the plate 40, depending on the relationship of the distance scale 14 to the diaphragm aperture scale 34. When the ring 30 turns in a direction to open up the diaphragm aperture to a larger opening (or a smaller $f$ number on the scale 34) the bodily movement of the plate 40 will, through the driving pin 42, cause corresponding rotation of the ring 16 and, through the gears 22, 24, opposite rotation of the ring 18, thus bringing the two pointer arms 10 and 12 closer to each other to indicate a reduction of the depth of field, which follows from the opening of the diaphragm to a larger aperture. Conversely, if the ring 30 is moved in a direction to close down the diaphragm aperture to a smaller stop (indicated by a larger *f* number on the scale 34) this will cause rotation of the rings 16 and 18 in a direction to separate the pointers 10 and 12 farther from each other, to indicate the increase in the depth of field which results from the smaller diaphragm stop.

However, the motions of the rings 16 and 18 will not necessarily be exactly the same in angular extent as the motion of the ring 30, but can be varied by proper shaping of the cam slot 48, to take care of the non-linear relationship between variations in diaphragm aperture size resulting from movement of the ring 30, and variations in depth of field as expressed on the focusing scale or distance scale 14. Thus when the shape of the cam slot 48 causes the plate 40 to swing in one direction or the other on its pivot 38, then in addition to the bodily movement of the plate 40 with its pivot, the swinging movement of the plate on its pivot will shift the position of the pin 42 relative to the pivot 38 in a circumferential direction so as to cause a variation in the position of the ring 16 relative to the ring 30, so that the two rings can be made to move in a non-linear manner relative to each other.

In the preferred construction, a main index mark or reference point 108 (Fig. 5) is placed on the stationary cylindrical portion of the member 20, and constitutes the index or reference point for reading the distance scale or focusing scale 14 placed on the cylindrical face 92 of the focusing lens mount 90, as well as reading the shutter speed scale 110 placed on the rotatable shutter speed setting ring 72, and the *f* number or diaphragm aperture scale 34 placed on the diaphragm setting ring or coupling ring 74. Since the diaphragm adjusting member 66 may be coupled to the shutter speed setting member 72 in various positions, as above explained, it is convenient to provide also an exposure scale 112 marked on the ring 74 and read in conjunction with an index mark 114 on the ring 72, so that the diaphragm and the shutter speed adjusting members may be coupled to each other in accordance with various actinic light values or other pertinent factors represented by the scale 112, independently of the diaphragm aperture scale 34 which, in fact, may be entirely omitted.

In the position of the parts shown in Fig. 5, the lens mount is shown focused for an object distance of five meters (read on the scale 14, opposite the index mark 108) and the pointers 10 and 12 indicate that the depth of field includes the range from a distance of three meters to a distance of eight meters. The shutter is also shown set for a speed of 1/15 of a second (read on the scale 110 opposite the same main index 108) and the diaphragm is set for an aperture of *f*:5.6 (read on the scale 34 opposite the same main index 108). The scale 112, read in conjunction with the supplementary pointer 114, shows the relationship between the shutter speed and the diaphragm aperture independently of the absolute values of either of them. Hence it is possible to omit the diaphragm aperture scale 34 entirely, without destroying the usefulness of the shutter. The diaphragm aperture is really meaningless and unimportant except insofar as it affects the depth of field and the amount of light reaching the film. Since the depth of field is adequately indicated by the pointers 10 and 12, the diaphragm aperture scale is not needed for this purpose, and since the amount of light reaching the film is indicated by the relative (rather than absolute) setting of the members 72 and 74, as read on the scale 112, the diaphragm aperture scale is not needed for this purpose.

As mentioned above, the construction is particularly compact and simple in form, and may easily be accommodated within the space limitations of modern lens and shutter structures. The same structure may also be used in conjunction with a distance or focusing scale placed on the shutter casing or the camera body, rather than on the lens mount. In addition, the indicating mechanism can of course also be fitted to any other part of the lens system or the mounting thereof, than that represented in the drawings, and may be used with lenses having a worm drive for setting or focusing, or with interchangeable lens structures.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic lens and shutter structure comprising a shuter casing, a focusing lens mount carried by said shutter casing and rotatable relative to said casing for focusing, a focusing distance scale carried by said mount and extending circumferentially thereon, a pair of rings rotatably mounted on said shutter casing and operatively coupled to each other to turn conjointly in opposite directions, pointers carried by said rings and movable toward and away from each other along said distance scale as said rings are turned, to indicate with reference to said scale the depth of field for which the lens and shutter structure is set, a diaphragm aperture adjusting member rotatably mounted on said shutter casing, and motion transmitting means operatively connecting said aperture adjusting member to one of said rings to turn the latter from turning movement of the former, said transmitting means including an oscillatable coupling member pivotally mounted on said aperture adjusting member to move bodily therewith, a pin and slot connection between said coupling member and said one of said rings, and a cam for oscillating said coupling member as said aperture adjusting member turns, to vary the position of said one of said rings relative to said aperture adjusting member.

2. A photographic lens and shutter structure comprising a shutter casing, a focusing lens mount carried by said shutter casing and rotatable relative to said casing for focusing, a focusing distance scale carried by said mount and extending circumferentially thereon, a pair of rings rotatably mounted on said shutter casing and operatively coupled to each other to turn conjointly in opposite directions, pointers carried by said rings and movable toward and away from each other along said distance scale as said rings are turned, to indicate with reference to said scale the depth of field for which the lens and shutter structure is set, a diaphragm aperture adjusting member rotatably mounted on said shutter casing, and variable motion transmitting means operatively connecting said aperture adjusting member to one of said rings to turn the latter from turning movement of the former, said variable motion transmitting means including a coupling member carried by said aperture adjusting member to move bodily therewith and also mounted for movement relative to said aperture adjusting member, a pin and slot connection between said coupling member and one of said rings, a stationary cam member having a cam slot therein, and a control pin on said coupling member engaging in said cam slot to turn said coupling member on its pivot as said coupling member moves bodily with rotation of said aperture adjusting member.

3. Depth of field indicating means for a photographic shutter having an optical axis, comprising a field distance scale arranged substantially concentric to said optical axis, a diaphragm aperture adjusting member mounted for rotation about said optical axis, a pair of pointer members mounted for rotation in opposite directions about said optical axis to sweep over said field scale to indicate thereon the depth of field for which said shutter is set, an oscillatable link operatively connecting said aperture adjusting member to one of said pointer members to turn the latter from the turning movements of the former, and a cam cooperating with said link to oscillate the same as said aperture adjusting member moves from one position to another, to alter the angular relationship of said one of said pointer members with respect to said aperture adjusting member at different positions of the latter.

4. A photographic camera having a device for indicating the depth of field of the camera, comprising depth indicating elements, a movable driving element, a transposing element carried by and moving with said driving element, a driving member carried by said transposing element and engaging one of said depth indicating elements to move the same from motion of said transposing element, and a cam track operatively connected to said transposing element to superimpose on said transposing element an oscillating motion in addition to the motion imparted thereto by said driving element, said device having an optical axis, said indicating elements having the form of radial arms attached to two indicating rings coaxial with said optical axis and operatively interconnected to each other by toothed reversing gearing.

5. A construction as defined in claim 4, in which said transposing element has the form of an oscillating plate rotatably mounted on a pin carried by said driving element, and in which said driving member carried by said transposing element is in the form of a pin carried by said oscillatory plate and engaging one of said indicating rings, and in which said oscillating plate carries also a control pin engaging said cam track.

6. A construction as defined in claim 5, in which said cam track is formed in a fixed ring coaxial with said optical axis.

References Cited in the file of this patent

UNITED STATES PATENTS

| | | |
|---|---|---|
| 2,342,819 | Priesemann | Feb. 29, 1944 |
| 2,350,009 | Babcock et al. | May 30, 1944 |

FOREIGN PATENTS

| | | |
|---|---|---|
| 139,562 | Austria | Nov. 26, 1934 |
| 1,028,877 | France | Mar. 4, 1953 |
| 1,111,448 | France | Oct. 26, 1955 |